United States Patent
Kramer et al.

(10) Patent No.: US 12,129,377 B2
(45) Date of Patent: Oct. 29, 2024

(54) POLYURETHANE COMPOSITION HAVING POLYMERIC PLASTICIZER AND A LOW CONTENT OF MONOMERIC DIISOCYANATES

(71) Applicant: SIKA TECHNOLOGY AG, Baar (CH)

(72) Inventors: Andreas Kramer, Zürich (CH); Michael Schlumpf, Stallikon (CH); Urs Burckhardt, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 714 days.

(21) Appl. No.: 17/263,323

(22) PCT Filed: Aug. 5, 2019

(86) PCT No.: PCT/EP2019/071049
§ 371 (c)(1),
(2) Date: Jan. 26, 2021

(87) PCT Pub. No.: WO2020/030606
PCT Pub. Date: Feb. 13, 2020

(65) Prior Publication Data
US 2021/0147674 A1 May 20, 2021

(30) Foreign Application Priority Data
Aug. 8, 2018 (EP) .................................. 18187903

(51) Int. Cl.
*C08L 75/08* (2006.01)
*C08G 18/10* (2006.01)
*C08G 18/30* (2006.01)
*C08G 18/48* (2006.01)
*C08G 18/71* (2006.01)
*C08G 18/73* (2006.01)
*C08G 18/75* (2006.01)
*C08G 18/76* (2006.01)
*C08K 3/04* (2006.01)
*C08K 3/36* (2006.01)

(52) U.S. Cl.
CPC .............. *C08L 75/08* (2013.01); *C08G 18/10* (2013.01); *C08G 18/307* (2013.01); *C08G 18/485* (2013.01); *C08G 18/71* (2013.01); *C08G 18/73* (2013.01); *C08G 18/755* (2013.01); *C08G 18/7621* (2013.01); *C08G 18/7657* (2013.01); *C08K 3/04* (2013.01); *C08K 3/36* (2013.01); *C08G 2150/00* (2013.01); *C08G 2170/00* (2013.01)

(58) Field of Classification Search
CPC .... C08G 18/10; C08G 18/307; C08G 18/485; C08G 18/7657; C08G 18/0838; C08L 75/08
See application file for complete search history.

(56) References Cited

U.S. PATENT DOCUMENTS

| | | | | |
|---|---|---|---|---|
| 4,906,707 A | * | 3/1990 | Yukimoto | C08L 71/02 528/29 |
| 7,345,130 B2 | * | 3/2008 | Zhu | C09J 183/14 428/447 |
| 2009/0202837 A1 | | 8/2009 | Onuoha et al. | |

FOREIGN PATENT DOCUMENTS

| | | |
|---|---|---|
| CN | 102690626 A | 9/2012 |
| DE | 10 2005 035 000 A1 | 1/2007 |
| EP | 1746117 A1 | 1/2007 |
| JP | S59109553 A | 6/1984 |
| JP | H07-324161 A | 12/1995 |
| JP | 2002-053635 A | 2/2002 |
| JP | 2008-208319 A | 9/2008 |
| JP | 2010-90269 A | 4/2010 |
| WO | 99/52960 A1 | 10/1999 |
| WO | WO-2020099314 A1 * 5/2020 ............. C08G 18/12 |

OTHER PUBLICATIONS

Oct. 15, 2019 International Search Report issued in Patent Application No. PCT/EP2019/071049.
Feb. 9, 2021 International Preliminary Report on Patentability issued in Patent Application No. PCT/EP2019/071049.

* cited by examiner

Primary Examiner — Michael L Leonard
(74) Attorney, Agent, or Firm — Oliff PLC

(57) ABSTRACT

A moisture-curing polyurethane composition having a content of monomeric diisocyanates of at most 0.1 wt %, containing: at least one isocyanate-group-containing polyurethane polymer having a content of monomeric diisocyanates of at most 0.5 wt %, obtained from reaction of at least one monomeric diisocyanate with at least one polyether polyol at a NCO/OH ratio of at least 3/1 and subsequent removal of a large part of monomeric diisocyanates by way of a suitable separating method; and at least one polyether having blocked hydroxyl groups and free of isocyanate groups, as a plasticizer. Moisture-curing polyurethane composition is highly storage-stable when moisture is excluded, can be safely handled without special safety precautions, can be sold without hazard label, can be well processed, has long open time and has fast curing to form elastic material of high strength and extensibility, high cold flexibility, good adhesion properties and high stability with respect to heat and moisture.

11 Claims, No Drawings

POLYURETHANE COMPOSITION HAVING POLYMERIC PLASTICIZER AND A LOW CONTENT OF MONOMERIC DIISOCYANATES

TECHNICAL FIELD

The invention relates to moisture-curing polyurethane compositions and to the use thereof as elastic adhesives, sealants and coatings.

STATE OF THE ART

Polyurethane compositions which crosslink through reaction of isocyanate groups with moisture or water and cure to give elastomers are especially used as elastic adhesives, sealants or coatings in the construction and manufacturing industry, for example for bonding of components in assembly, for filling joints, as floor coating or as roof seal. Owing to their good adhesion and elasticity, they can gently damp and buffer forces acting on the substrates, triggered for instance by vibrations or variations in temperature.

Such polyurethane compositions contain conventional polymers containing isocyanate groups as binders, which are prepared by reacting polyols with monomeric diisocyanates. The polymers thus obtained, on account of chain extension reactions, contain a residual monomeric diisocyanate content, typically in the range from 1% to 3% by weight. Monomeric diisocyanates are potentially harmful to health. Formulations containing monomeric diisocyanates, in particular above a concentration of 0.1% by weight, must be provided with hazard symbols and warning messages on the label and in the data sheets, and in some countries may be subject to regulations in respect of sale and use. There are various approaches to polymers containing isocyanate groups with a low monomeric diisocyanate content. In terms of product properties, the most attractive route is to use the monomeric diisocyanate in excess in the preparation of the polymer and then to remove the majority of the unconverted monomeric diisocyanate by means of a suitable separation method, especially by means of distillation. Polymers from this process have a comparatively low viscosity and a low residual monomeric diisocyanate content. Polyurethane compositions comprising such polymers have very good processability, but show slow curing, reduced strength, and weaknesses in the development of adhesion to the substrates.

EP 1,746,117 describes a process for preparing prepolymers containing isocyanate groups. In examples 1 and 3, NCO prepolymers with a low monomer level are prepared from the reaction of diphenylmethane 4,4'-diisocyanate and diols or triols, with distillative removal of the excess diphenylmethane 4,4'-diisocyanate, and these are compared with NCO prepolymers that are prepared without distillative removal of monomeric isocyanate, for which diphenylmethane 2,4'-diisocyanate rather than the 4,4' isomer is of better suitability. The prepolymers described can be used for production of moisture-curing sealants or adhesives. There are no further details as to how such sealants or adhesives are formulated advantageously.

The use of polyether polyols having blocked hydroxyl groups as plasticizer in polyurethane compositions is known, for example from JP S59-109553. The compositions described comprise conventionally prepared polyurethane polymers and have a high monomeric diisocyanate content.

SUMMARY OF THE INVENTION

It is therefore an object of the present invention to provide moisture-curing polyurethane compositions having a low monomeric diisocyanate content, which overcome the disadvantages of the prior art.

The object is achieved by the moisture-curing polyurethane composition as claimed in claim 1. It comprises at least one polyetherurethane polymer containing isocyanate groups and having a low monomeric diisocyanate content, and at least one oligomeric mono- or polyol having blocked hydroxyl groups as plasticizer. The composition of the invention has a monomeric diisocyanate content of less than 0.1%; it can thus be safely handled even without special safety precautions and can be sold without hazard labeling in many countries. The composition of the invention surprisingly has a rapid curing rate coupled with long open time (skin time), and has high tensile strength and elasticity after curing, which is very advantageous for many applications. Unexpectedly, the polyurethane composition of the invention shows faster curing with the same open time, and higher tensile strength compared to corresponding compositions comprising conventional plasticizer and compared to corresponding compositions having a high monomeric diisocyanate content with consistently high extensibility and Shore hardness. These advantageous properties cannot be expected from the prior art.

The moisture-curing polyurethane composition of the invention has excellent storage stability with exclusion of moisture and good processability, and has a long open time coupled with rapid curing. This gives rise to an elastic material of high tensile strength coupled with high extensibility, high cold flexibility, good bonding properties and high stability to heat and moisture.

The moisture-curing polyurethane composition is particularly suitable for use as an elastic adhesive, elastic sealant or elastic coating.

Further aspects of the invention are the subject of further independent claims. Particularly preferred embodiments of the invention are the subject of the dependent claims.

Ways of Executing the Invention

The invention provides a moisture-curing polyurethane composition having a monomeric diisocyanate content of not more than 0.1% by weight, comprising
at least one polyetherurethane polymer containing isocyanate groups and having a monomeric diisocyanate content of not more than 0.5% by weight, obtained from the reaction of at least one monomeric diisocyanate with at least one polyether polyol in an NCO/OH ratio of at least 3/1, and subsequent removal of a majority of the monomeric diisocyanates by means of a suitable separation method, and
at least one polyether having blocked hydroxyl groups, which is free of isocyanate groups, as plasticizer.

"Monomeric diisocyanate" refers to an organic compound having two isocyanate groups separated by a divalent hydrocarbyl radical having 4 to 15 carbon atoms.

A "polyetherurethane polymer" refers to a polymer having ether groups as repeat units and additionally containing urethane groups.

Substance names beginning with "poly", such as polyol, refer to substances containing, in a formal sense, two or more of the functional groups that occur in their name per molecule.

A "blocked hydroxyl group" refers to a hydroxyl group converted by chemical reaction to a group unreactive toward isocyanate groups.

A "plasticizer" refers to a substance which is liquid at room temperature and remains unchanged in the composition after curing thereof and plasticizes the cured composition.

"NCO content" refers to the content of isocyanate groups in % by weight.

"Molecular weight" refers to the molar mass (in g/mol) of a molecule or a molecule residue. "Average molecular weight" refers to the number-average molecular weight ($M_n$) of a polydisperse mixture of oligomeric or polymeric molecules or molecule residues. It is determined by means of gel permeation chromatography (GPC) against polystyrene as standard, especially with tetrahydrofuran as mobile phase, refractive index detector and evaluation from 200 g/mol.

A substance or composition is referred to as "storage-stable" or "storable" when it can be stored at room temperature in a suitable container over a prolonged period, typically over at least 3 months to up to 6 months or more, without any change in its application or use properties to a degree of relevance for the use thereof as a result of the storage.

"Room temperature" refers to a temperature of 23° C.

All industry standards and norms mentioned in this document relate to the versions valid at the date of first filing.

Percentages by weight (% by weight), abbreviated to wt %, refer to proportions by mass of a constituent of a composition or a molecule, based on the overall composition or the overall molecule, unless stated otherwise. The terms "mass" and "weight" are used synonymously in the present document.

The polyetherurethane polymer containing isocyanate groups according to claim 1 may also be referred to as polyurethane prepolymer.

The polyetherurethane polymer containing isocyanate groups preferably has a monomeric diisocyanate content of not more than 0.3% by weight, especially not more than 0.2% by weight.

Preferably, the polyetherurethane polymer containing isocyanate groups has an average molecular weight $M_n$ in the range from 1'500 to 20'000 g/mol, preferably 2'500 to 15'000 g/mol, especially 3'500 to 10'000 g/mol.

The polyetherurethane polymer containing isocyanate groups preferably has an NCO content in the range from 0.5% to 6% by weight, particularly preferably 0.6% to 4% by weight, more preferably 1% to 3% by weight, especially 1.2% to 2.5% by weight.

Repeat units present in the polyetherurethane polymer containing isocyanate groups are preferably 1,2-ethyleneoxy, 1,2-propyleneoxy, 1,3-propyleneoxy, 1,2-butyleneoxy or 1,4-butyleneoxy groups. Preference is given to 1,2-ethyleneoxy and 1,2-propyleneoxy groups.

More preferably, repeat units present therein are mainly or exclusively 1,2-propyleneoxy groups.

A particularly preferred polyetherurethane polymer containing isocyanate groups has 80% to 100% by weight of 1,2-propyleneoxy groups in the polyether segment and 0% to 20% by weight of 1,2-ethyleneoxy groups.

If 1,2-ethyleneoxy groups are also present, the 1,2-propyleneoxy groups and the 1,2-ethyleneoxy groups each especially form homogeneous blocks, and the poly(1,2-ethyleneoxy) blocks are at the chain ends. Such a polymer enables moisture-curing polyurethane compositions having particularly rapid curing and particularly good heat stability.

The preferred polyetherurethane polymers containing isocyanate groups enable high-quality, efficiently processable moisture-curing polyurethane compositions having high strength, extensibility and elasticity.

Suitable monomeric diisocyanates are commercial aromatic or aliphatic diisocyanates such as, in particular, diphenylmethane 4,4'-diisocyanate, optionally with fractions of diphenylmethane 2,4'- and/or 2,2'-diisocyanate (MDI), tolylene 2,4-diisocyanate or mixtures thereof with tolylene 2,6-diisocyanate (TDI), phenylene 1,4-diisocyanate (PDI), naphthalene 1,5-diisocyanate (NDI), hexane 1,6-diisocyanate (HDI), 2,2(4),4-trimethylhexamethylene 1,6-diisocyanate (TMDI), cyclohexane 1,3- or 1,4-diisocyanate, 1-isocyanato-3,3,5-trimethyl-5-isocyanatomethylcyclohexane (isophorone diisocyanate or IPDI), perhydrodiphenylmethane 2,4'- or 4,4'-diisocyanate (HMDI), 1,3- or 1,4-bis(isocyanatomethyl)cyclohexane, m- or p-xylylene diisocyanate (XDI), or mixtures thereof.

The monomeric diisocyanate used for the reaction is preferably diphenylmethane 4,4'-diisocyanate (4,4'-MDI), tolylene 2,4-diisocyanate or mixtures thereof with tolylene 2,6-diisocyanate (TDI), 1-isocyanato-3,3,5-trimethyl-5-isocyanatomethylcyclohexane (IPDI) or hexane 1,6-diisocyanate (HDI). Preference is also given to a combination of two or more of these monomeric diisocyanates.

Particular preference is given to 4,4'-MDI. This 4,4'-MDI is of a quality that contains only small fractions of diphenylmethane 2,4'- and/or 2,2'-diisocyanate and is solid at room temperature. It enables moisture-curing polyurethane compositions having particularly rapid curing and particularly high strength coupled with high extensibility and elasticity.

The 4,4'-MDI has preferably been distilled and has a purity of at least 95%, especially at least 97.5%.

A commercially available diphenylmethane 4,4'-diisocyanate of this quality is, for example, Desmodur® 44 MC (from Covestro) or Lupranat® MRSS or ME (from BASF) or Suprasec® 1400 (from Huntsman).

Also particularly preferred is 1-isocyanato-3,3,5-trimethyl-5-isocyanatomethylcyclohexane (IPDI). IPDI-based moisture-curing polyurethane compositions have high strength coupled with high extensibility and elasticity, and enable products having particularly high weathering stability.

The polyether polyol preferably has an average molecular weight $M_n$ in the range from 1'000 to 15'000 g/mol, more preferably 1'500 to 12'000 g/mol, especially 2'000 to 8'000 g/mol.

The polyether polyol preferably has an OH number in the range from 8 to 112 mg KOH/g, more preferably in the range from 10 to 75 mg KOH/g, especially in the range from 12 to 56 mg KOH/g.

The polyether polyol preferably has an average OH functionality in the range from 1.7 to 3.

Suitable polyether polyols are polyoxyalkylene diols and/or polyoxyalkylene triols, especially polymerization products of ethylene oxide or 1,2-propylene oxide or 1,2- or 2,3-butylene oxide or oxetane or tetrahydrofuran or mixtures thereof, where these may be polymerized with the aid of a starter molecule having two or three active hydrogen atoms, especially a starter molecule such as water, ammonia or a compound having multiple OH or NH groups, such as, for example, ethane-1,2-diol, propane-1,2- or -1,3-diol, neopentyl glycol, diethylene glycol, triethylene glycol, the isomeric dipropylene glycols or tripropylene glycols, the isomeric butanediols, pentanediols, hexanediols, heptanediols, octanediols, nonanediols, decanediols, undecanediols, cyclohexane-1,3- or -1,4-dimethanol, bisphenol A, hydrogenated bisphenol A, 1,1,1-trimethylolethane, 1,1,1-trimethylopropane, glycerol or aniline, or mixtures of the above-mentioned compounds.

Particular preference is given to polyoxypropylene diols, polyoxypropylene triols, or ethylene oxide-terminated polyoxypropylene diols or triols. These are polyoxyethylene/polyoxypropylene copolyols which are obtained especially by further alkoxylating polyoxypropylene diols or triols with ethylene oxide on conclusion of the polypropoxylation reaction, with the result that they ultimately have primary hydroxyl groups.

Preferred polyether polyols have a level of unsaturation of less than 0.02 meq/g, especially less than 0.01 meq/g.

In one embodiment, preference is given to a trimethylolpropane- or especially glycerol-started, optionally ethylene oxide-terminated polyoxypropylene triol having an OH number in the range from 20 to 42 mg KOH/g, especially 22 to 35 mg KOH/g, and an average OH functionality in the range from 2.2 to 3.0, preferably 2.2 to 2.8, especially 2.2 to 2.6. In a further embodiment, preference is given to a polyoxypropylene diol having an OH number in the range from 8 to 112 mg KOH/g, preferably in the range from 10 to 75 mg KOH/g, especially in the range from 12 to 56 mg KOH/g.

The NCO/OH ratio in the reaction between the monomeric diisocyanate with the polyether polyol is preferably in the range from 3/1 to 10/1, more preferably in the range from 3/1 to 8/1, especially in the range from 4/1 to 7/1.

The reaction is preferably conducted with exclusion of moisture at a temperature in the range from 20 to 160° C., especially 40 to 140° C., optionally in the presence of suitable catalysts.

After the reaction, the monomeric diisocyanate remaining in the reaction mixture is removed by means of a suitable separation method down to the residual content described.

A preferred separation method is a distillative method, especially thin-film distillation or short-path distillation, preferably with application of reduced pressure.

Particular preference is given to a multistage method in which the monomeric diisocyanate is removed in a short-path evaporator with a jacket temperature in the range from 120 to 200° C. and a pressure of 0.001 to 0.5 mbar. In the case of 4,4'-MDI, which is preferred as monomeric diisocyanate, distillative removal is particularly demanding. It has to be ensured, for example, that the condensate does not solidify and block the system. Preference is given to working with a jacket temperature in the range from 160 to 200° C. at 0.001 to 0.5 mbar, and condensing the monomer removed at a temperature in the range from 40 to 60° C.

In the case of IPDI, which is preferred as monomeric diisocyanate, the jacket temperature is preferably in the range from 140 to 180° C.

Preference is given to reacting the monomeric diisocyanate with the polyether polyol and subsequently removing the majority of the monomeric diisocyanate remaining in the reaction mixture without the use of solvents or entraining agents.

Preference is given to subsequently reusing the monomeric diisocyanate removed after the reaction, i.e. using it again for the preparation of polyetherurethane polymer containing isocyanate groups.

In the reaction, the OH groups of the polyether polyol react with the isocyanate groups of the monomeric diisocyanate. This also results in what are called chain extension reactions, in that there is reaction of OH groups and/or isocyanate groups of reaction products between polyol and monomeric diisocyanate. The higher the NCO/OH ratio chosen, the lower the level of chain extension reactions that takes place, and the lower the polydispersity and hence the viscosity of the polymer obtained. A measure of the chain extension reaction is the average molecular weight of the polymer, or the breadth and distribution of the peaks in the GPC analysis. A further measure is the effective NCO content of the polymer freed of monomers relative to the theoretical NCO content calculated from the reaction of every OH group with a monomeric diisocyanate.

The NCO content in the polyetherurethane polymer is preferably at least 80%, especially at least 85%, of the theoretical NCO content which is calculated from the addition of one mole of monomeric diisocyanate per mole of OH groups of the polyether polyol. Such a polyetherurethane polymer has particularly low viscosity and enables moisture-curing polyurethane compositions having particularly good application properties.

A particularly preferred polyetherurethane polymer has an NCO content in the range from 1% to 2.5% by weight, especially 1.1% to 2.1% by weight, and a monomeric diisocyanate content of not more than 0.3% by weight, especially not more than 0.2% by weight, and is obtained from the reaction of 4,4'-MDI or IPDI with an optionally ethylene oxide-terminated polyoxypropylene triol having average OH functionality in the range from 2.2 to 3, preferably 2.2 to 2.8, especially 2.2 to 2.6, and an OH number in the range from 20 to 42 mg KOH/g, especially in the range from 22 to 35 mg KOH/g. Such a polymer enables a particularly attractive combination of low viscosity, long open time coupled with rapid curing and high extensibility and elasticity and high strength.

A further particularly preferred polyetherurethane polymer has an NCO content in the range from 0.8% to 2.4% by weight, especially 1.2% to 2.1% by weight, and a monomeric diisocyanate content of not more than 0.3% by weight, especially not more than 0.2% by weight, and is obtained from the reaction of 4,4'-MDI with a polyoxypropylene diol having an OH number in the range from 13 to 38 mg KOH/g, especially 22 to 32 mg KOH/g. Such a polymer is of particularly low viscosity and is especially suitable for combination with a compound containing isocyanate groups and having an NCO functionality of at least 2.2, especially an oligomeric isocyanate or a corresponding polymer containing isocyanate groups. It enables particularly high extensibility and elasticity.

The moisture-curing polyurethane composition preferably contains 10% to 90% by weight, more preferably 15% to 80% by weight, especially 20% to 60% by weight, of polyetherurethane polymer containing isocyanate groups and having a monomeric diisocyanate content of not more than 0.5% by weight.

The moisture-curing polyurethane composition further comprises at least one polyether having blocked hydroxyl groups, which is free of isocyanate groups, as plasticizer.

The hydroxyl groups of the polyether are especially blocked in such a way that it does not enter into any chemical reactions before and during the curing of the polyurethane composition, i.e. remains unchanged in the cured composition.

If the moisture-curing polyurethane composition comprises blocked amines such as oxazolidines or aldimines in particular, the polyether having blocked hydroxyl groups is preferably free of aceto ester groups.

The polyether having blocked hydroxyl groups is preferably liquid at room temperature.

The polyether having blocked hydroxyl groups preferably has a viscosity at 20° C. in the range from 30 to 5'000 mPa·s, more preferably 40 to 2'000 mPa·s, especially preferably 50 to 1'000 mPas, in particular 50 to 500 mPas. The viscosity is determined here with a cone-plate viscometer having a cone diameter 25 mm, cone angle 1°, cone tip-plate distance 0.05 mm, at a shear rate of 10 s$^{-1}$.

The blocked hydroxyl groups are preferably selected from ester, aceto ester, carbonate, acetal and urethane groups. Preference is given to ester, aceto ester, carbonate or urethane groups. Hydroxyl groups are particularly easily convertible to these groups, and they are particularly stable and compatible with polyetherurethane polymers.

Particular preference is given to ester, carbonate or urethane groups, especially ester or urethane groups. These groups are also stable in compositions containing blocked amines releasable by means of hydrolysis, such as oxazolidines or aldimines, and do not react with the amines released therefrom in the course of curing of the composition.

Most preferred are ester groups, especially acetate groups. These enable particularly low viscosity and are easily obtainable.

Particular preference is given to an ester group, especially an ester group having 1 to 8 carbon atoms, especially an acetate group or benzoate group.

These are preparable in a particularly simple manner.

Most preferred is an acetate group. A polyether having blocked hydroxyl groups in the form of acetate groups is of particularly low viscosity, is preparable in a very particularly simple manner and is particularly inexpensive.

Also preferred is a urethane group, especially a phenylurethane group or a p-toluenesulfonylurethane group. A polyether having such blocked hydroxyl groups has a manageable viscosity and is preparable in a particularly simple manner.

A preferred aceto ester group is an acetoacetate group, but only if the composition is free of blocked amines releasable by means of hydrolysis.

A preferred carbonate group is a methyl carbonate group.

A preferred acetal group is a 1,4-dimethyl-2-oxapentoxy group, a 2-oxacyclopentyloxy group or a 2-oxacyclohexyloxy group, especially a 1,4-dimethyl-2-oxapentoxy group.

Repeat units present in the polyether having blocked hydroxyl groups are preferably 1,2-ethyleneoxy, 1,2-propyleneoxy, 1,3-propyleneoxy, 1,2-butyleneoxy or 1,4-butyleneoxy groups, especially 1,2-propyleneoxy groups. Preferably at least 70%, especially at least 80%, of the repeat units consist of 1,2-propyleneoxy groups, and optionally at most 30%, especially at most 20%, of the repeat units consist of 1,2-ethyleneoxy groups.

More preferably, the repeat units consist entirely of 1,2-propyleneoxy groups. This enables polyurethane compositions having particularly good hydrolysis stability.

More preferably, the polyether having blocked hydroxyl groups is derived from a hydroxy-functional polyether having an average OH functionality in the range from 1 to 3, especially 1 to 2.

Suitable hydroxy-functional polyethers having an OH functionality of 1 are especially what are called polyoxypropylene monools.

Preferred starters for polyoxypropylene monools are methanol, ethanol, propanol, isopropanol, butanol, isobutanol, tert-butanol, pentanol, hexanol, 2-ethylhexanol, lauryl alcohol, myristyl alcohol, palmityl alcohol, allyl alcohol, cyclohexanol, benzyl alcohol or phenol, especially methanol, ethanol or butanol, most preferably butanol.

Suitable hydroxy-functional polyethers having an OH functionality of >1 are especially what are called polyoxypropylene polyols.

Preferred starters for polyoxypropylene polyols are ethane-1,2-diol, propane-1,2-diol, propane-1,3-diol, butane-1,4-diol, trimethylolpropane, glycerol, pentaerythritol, butane-1,2,3,4-tetraol (threitol or erythritol), pentane-1,2,3,4,5-pentol (xylitol) or hexane-1,2,3,4,5,6-hexol (mannitol or sorbitol), more preferably ethane-1,2-diol, propane-1,2-diol, propane-1,3-diol, butane-1,4-diol, trimethylolpropane or glycerol, especially propane-1,2-diol or glycerol, most preferably propane-1,2-diol.

The polyether having blocked hydroxyl groups preferably has an average molecular weight $M_n$ in the range from 600 to 15'000 g/mol, particularly preferably 700 to 10'000 g/mol, more preferably 900 to 5'000 g/mol, especially 900 to 2'500 g/mol, determined by means of gel permeation chromatography (GPC) against polystyrene as standard with tetrahydrofuran as mobile phase, refractive index detector and evaluation from 200 g/mol.

This affords moisture-curing polyurethane compositions having particularly high extensibility and elasticity. Such compositions especially have a long processing time (open time) coupled with rapid curing and high cold flexibility.

In a preferred embodiment, the polyether having blocked hydroxyl groups is derived from a butanol-started polyoxypropylene monool having an OH number in the range from 25 to 90 mg KOH/g, preferably in the range from 50 to 80 mg KOH/g. This affords moisture-curing polyurethane compositions having particularly good processability and particularly high cold flexibility. The blocked hydroxyl group here is preferably an acetate group.

In a further preferred embodiment, the polyether having blocked hydroxyl groups is derived from a polyoxypropylene diol having an OH number in the range from 12 to 125 mg KOH/g, preferably in the range from 22 to 125 mg KOH/g, especially in the range from 45 to 125 mg KOH/g. This affords moisture-curing polyurethane compositions having very good processability and good cold flexibility. The blocked hydroxyl groups here are preferably acetate groups.

In a further preferred embodiment, the polyether having blocked hydroxyl groups is derived from a trimethylolpropane- or especially glycerol-started, optionally ethylene oxide-terminated polyoxypropylene triol having an average OH functionality in the range from 2.2 to 3 and an OH number in the range from 22 to 56 mg KOH/g.

The polyether having blocked hydroxyl groups is especially obtained by reacting at least one hydroxy-functional polyether with at least one suitable blocking agent for hydroxyl groups.

For the reaction, the blocking agent is used at least stoichiometrically in relation to the hydroxyl groups. For the blocking, methods customary for the respective reactive groups are used, optionally with additional use of catalysts or solvents.

If the blocking reaction forms elimination products, these are removed from the reaction mixture by a suitable method, especially by means of distillation.

Suitable blocking agents are nucleophilic compounds that enter into an addition or substitution reaction with hydroxyl groups.

Especially suitable are carboxylic acids, carbonyl chlorides, carboxylic esters or carboxylic anhydrides, diketene, 2,2,5-trimethyl-4H-1,3-dioxin-2-one, tert-butyl acetoacetate, dialkyl carbonates, monoisocyanates, (meth)acrylamides, methylenemalonates or cyanoacrylates.

Preference is given to carboxylic acids, carbonyl chlorides, carboxylic esters or carboxylic anhydrides, with formation of blocked hydroxyl groups in the form of ester groups. Among these, preference is given to carboxylic anhydrides or carboxylic esters, especially acetic anhydride.

In the case of acetic anhydride as blocking agent, acetic acid is distilled off in the course of the reaction, with formation of blocked hydroxyl groups in the form of acetate groups.

In the case of isopropenyl acetate as blocking agent, acetone is distilled off in the course of the reaction, likewise with formation of blocked hydroxyl groups in the form of acetate groups.

Preference is further given to diketene, 2,2,5-trimethyl-4H-1,3-dioxin-4-one or sterically hindered small aceto esters such as, in particular, tert-butyl acetoacetate, with formation of blocked hydroxyl groups in the form of aceto ester groups.

Preference is further given to dialkyl carbonates, with formation of blocked hydroxyl groups in the form of carbonate groups.

Preference is further given to monoisocyanates, with formation of blocked hydroxyl groups in the form of urethane groups. Preference is given to phenyl isocyanate or p-toluenesulfonyl isocyanate.

Suitable hydroxy-functional polyethers are especially those having an OH functionality in the range from 1 to 3 and an average molecular weight $M_n$ in the range from 600 to 15'000 g/mol, particularly preferably 700 to 10'000 g/mol, more preferably 900 to 5'000 g/mol, especially 900 to 2'500 g/mol.

Preference is given to polyoxypropylene monools having an OH number in the range from 25 to 90 mg KOH/g, preferably in the range from 50 to 80 mg KOH/g, especially alcohol-started polyoxypropylene monools, especially started from methanol, ethanol, propanol, isopropanol, butanol, isobutanol, tert-butanol, pentanol, hexanol, 2-ethylhexanol, lauryl alcohol, myristyl alcohol, palmityl alcohol, allyl alcohol, cyclohexanol, benzyl alcohol or phenol. Among these, preference is given to alkyl alcohol-started polyoxypropylene monools, especially started from methanol, ethanol or butanol. Particular preference is given to butanol-started polyoxypropylene monools having an average molecular weight $M_n$ in the range from 650 to 2'000 g/mol, especially 700 to 1'500 g/mol. Butanol-started polyoxypropylene monools are commercially available, for example as Synalox® 100-20B, Synalox® 100-40B or Synalox® 100-85B (all from Dow).

Preference is further given to polyoxypropylene diols having an OH number in the range from 12 to 125 mg KOH/g, preferably in the range from 22 to 125 mg KOH/g, especially in the range from 45 to 125 mg KOH/g.

Preference is further given to trimethylolpropane- or especially glycerol-started polyoxypropylene triols having an OH number in the range from 22 to 56 mg KOH/g, optionally containing proportions of 1,2-ethyleneoxy groups.

The moisture-curing polyurethane composition preferably contains 5% to 40% by weight, especially 5% to 35% by weight, of polyethers having blocked hydroxyl groups. Such a composition has good processability and high extensibility coupled with high strength.

The moisture-curing polyurethane composition may additionally comprise further polymers containing isocyanate groups, especially small proportions of conventionally prepared polymers containing isocyanate groups and having a higher monomeric diisocyanate content.

The moisture-curing polyurethane composition preferably additionally comprises at least one further constituent selected from oligomeric isocyanates, catalysts and fillers.

Suitable oligomeric isocyanates are especially HDI biurets such as Desmodur® N 100 or N 3200 (from Covestro), Tolonate® HDB or HDB-LV (from Vencorex) or Duranate® 24A-100 (from Asahi Kasei); HDI isocyanurates such as Desmodur® N 3300, N 3600 or N 3790 BA (all from Covestro), Tolonate® HDT, HDT-LV or HDT-LV2 (from Vencorex), Duranate® TPA-100 or THA-100 (from Asahi Kasei) or Coronate® HX (from Nippon Polyurethane); HDI uretdiones such as Desmodur® N 3400 (from Covestro); HDI iminooxadiazinediones such as Desmodur® XP 2410 (from Covestro); HDI allophanates such as Desmodur® VP LS 2102 (from Covestro); IPDI isocyanurates, for example in solution as Desmodur® Z 4470 (from Covestro) or in solid form as Vestanat® T1890/100 (from Evonik); TDI oligomers such as Desmodur® IL (from Covestro); or mixed isocyanurates based on TDI/HDI, such as Desmodur® HL (from Covestro).

Suitable catalysts are catalysts for the acceleration of the reaction of isocyanate groups, especially organotin(IV) compounds such as, in particular, dibutyltin diacetate, dibutyltin dilaurate, dibutyltin dichloride, dibutyltin diacetylacetonate, dimethyltin dilaurate, dioctyltin diacetate, dioctyltin dilaurate or dioctyltin diacetylacetonate, complexes of bismuth(III) or zirconium(IV), especially with ligands selected from alkoxides, carboxylates, 1,3-diketonates, oxinate, 1,3-ketoesterates and 1,3-ketoamidates, or compounds containing tertiary amino groups, such as especially 2,2'-dimorpholinodiethyl ether (DMDEE).

Suitable fillers are especially ground or precipitated calcium carbonates, optionally coated with fatty acids, especially stearates, barytes, quartz flours, quartz sands, dolomites, wollastonites, calcined kaolins, sheet silicates, such as mica or talc, zeolites, aluminum hydroxides, magnesium hydroxides, silicas, including finely divided silicas from pyrolysis processes, cements, gypsums, fly ashes, industrially produced carbon blacks, graphite, metal powders, for example of aluminum, copper, iron, silver or steel, PVC powders or hollow beads.

Preference is given to calcium carbonates that have optionally been coated with fatty acids, especially stearates, calcined kaolins or industrially produced carbon blacks.

The moisture-curing polyurethane composition may contain further additions, especially

- inorganic or organic pigments, especially titanium dioxide, chromium oxides or iron oxides;
- fibers, especially glass fibers, carbon fibers, metal fibers, ceramic fibers, polymer fibers, such as polyamide fibers or polyethylene fibers, or natural fibers, such as wool, cellulose, hemp or sisal;
- nanofillers such as graphene or carbon nanotubes;
- dyes;
- desiccants, especially molecular sieve powder, calcium oxide, highly reactive isocyanates such as p-tosyl isocyanate, monooxazolidines such as Incozol® 2 (from Incorez) or orthoformic esters;
- adhesion promoters, especially organoalkoxysilanes, especially epoxysilanes, such as especially 3-glycidoxypropyltrimethoxysilane or 3-glycidoxypropyltriethoxysilane, (meth)acrylosilanes, anhydridosilanes, carbamatosilanes, alkylsilanes or iminosilanes, or oligomeric forms of these silanes, or titanates;
- blocked amines, especially oxazolidines or aldimines, especially di- or trialdimines;

further plasticizers, especially carboxylic acid esters, such as phthalates, especially diisononyl phthalate (DINP), diisodecyl phthalate (DIDP) or di(2-propylheptyl) phthalate (DPHP), hydrogenated phthalates, especially hydrogenated diisononyl phthalate or diisononyl cyclohexane-1,2-dicarboxylate (DINCH), terephthalates, especially bis(2-ethylhexyl) terephthalate or diisononyl terephthalate, hydrogenated terephthalates, especially hydrogenated bis(2-ethylhexyl) terephthalate or diisononyl terephthalate, or bis(2-ethylhexyl) cyclohexane-1,4-dicarboxylate, trimellitates, adipates, especially dioctyl adipate, azelates, sebacates, benzoates, glycol ethers, glycol esters, organic phosphoric or sulfonic acid esters, polybutenes, polyisobutenes or plasticizers derived from natural fats or oils, especially epoxidized soybean or linseed oil;

further catalysts which accelerate the reaction of the isocyanate groups, especially salts, soaps or complexes of tin, zinc, bismuth, iron, aluminum, molybdenum, dioxomolybdenum, titanium, zirconium or potassium, especially tin(II) 2-ethylhexanoate, tin(II) neodecanoate, zinc(II) acetate, zinc(II) 2-ethylhexanoate, zinc(II) laurate, zinc(II) acetylacetonate, aluminum lactate, aluminum oleate, diisopropoxytitanium bis(ethyl acetoacetate) or potassium acetate; compounds containing tertiary amino groups, especially N-ethyldiisopropylamine, N,N,N',N'-tetramethylalkylenediamines, pentamethylalkylenetriamines and higher homologs thereof, bis(N,N-diethylaminoethyl) adipate, tris(3-dimethylaminopropyl)amine, 1,4-diazabicyclo[2.2.2]octane (DABCO), 1,8-diazabicyclo[5.4.0]undec-7-ene (DBU), 1,5-diazabicyclo[4.3.0]non-5-ene (DBN), N-alkylmorpholines, N,N'-dimethylpiperazine; aromatic nitrogen compounds, such as 4-dimethylaminopyridine, N-methylimidazole, N-vinylimidazole or 1,2-dimethylimidazole; organic ammonium compounds, such as benzyltrimethylammonium hydroxide or alkoxylated tertiary amines; what are called "delayed action" catalysts, which are modifications of known metal or amine catalysts;

rheology modifiers, especially thickeners, especially sheet silicates, such as bentonites, derivatives of castor oil, hydrogenated castor oil, polyamides, polyamide waxes, polyurethanes, urea compounds, fumed silicas, cellulose ethers or hydrophobically modified polyoxyethylenes;

solvents, especially acetone, methyl acetate, tert-butyl acetate, 1-methoxy-2-propyl acetate, ethyl 3-ethoxypropionate, diisopropyl ether, diethylene glycol diethyl ether, ethylene glycol diethyl ether, ethylene glycol monobutyl ether, ethylene glycol mono-2-ethylhexyl ether, acetals such as propylal, butylal, 2-ethylhexylal, dioxolane, glycerol formal or 2,5,7,10-tetraoxaundecane (TOU), toluene, xylene, heptane, octane, naphtha, white spirit, petroleum ether or gasoline, especially Solvesso™ grades (from Exxon), and propylene carbonate, dimethyl carbonate, butyrolactone, N-methylpyrrolidone, N-ethylpyrrolidone, p-chlorobenzotrifluoride or benzotrifluoride;

natural resins, fats or oils, such as rosin, shellac, linseed oil, castor oil or soybean oil;

nonreactive polymers, especially homo- or copolymers of unsaturated monomers, especially from the group comprising ethylene, propylene, butylene, isobutylene, isoprene, vinyl acetate or alkyl (meth)acrylates, especially polyethylenes (PE), polypropylenes (PP), polyisobutylenes, ethylene/vinyl acetate copolymers (EVA) or atactic poly-α-olefins (APAO);

flame-retardant substances, especially the aluminum hydroxide or magnesium hydroxide fillers already mentioned, and also especially organic phosphoric acid esters, such as especially triethyl phosphate, tricresyl phosphate, triphenyl phosphate, diphenyl cresyl phosphate, isodecyl diphenyl phosphate, tris(1,3-dichloro-2-propyl) phosphate, tris(2-chloroethyl) phosphate, tris(2-ethylhexyl) phosphate, tris(chloroisopropyl) phosphate, tris(chloropropyl) phosphate, isopropylated triphenyl phosphate, mono-, bis- or tris(isopropylphenyl) phosphates of different degrees of isopropylation, resorcinol bis(diphenylphosphate), bisphenol A bis(diphenylphosphate) or ammonium polyphosphates;

additives, especially wetting agents, leveling agents, defoamers, deaerators, stabilizers against oxidation, heat, light or UV radiation, or biocides;

or further substances customarily used in moisture-curing polyurethane compositions.

It may be advisable to chemically or physically dry certain substances before mixing them into the composition.

In the production of the polyurethane composition of the invention, the monomeric diisocyanate content is optionally further reduced by reaction with moisture present on mixing of the polyetherurethane polymer containing isocyanate groups with further constituents of the composition, especially fillers.

The moisture-curing polyurethane composition preferably contains

20% to 60% by weight of polyetherurethane polymer containing isocyanate groups and having a monomeric diisocyanate content of not more than 0.5% by weight, 5% to 35% by weight of polyether having blocked hydroxyl groups, 20% to 60% by weight of fillers, and optionally further constituents, especially oligomeric isocyanates, catalysts, commercial plasticizers, blocked amines, or further polymers containing isocyanate groups.

The moisture-curing polyurethane composition is especially produced with exclusion of moisture and stored at ambient temperature in moisture-tight containers. A suitable moisture-tight container especially consists of an optionally coated metal and/or plastic, and is especially a drum, a transport box, a hobbock, a bucket, a canister, a can, a bag, a tubular bag, a cartridge or a tube.

The moisture-curing polyurethane composition may be in the form of a one-component composition or in the form of a multi-component, especially two-component, composition.

A composition referred to as a "one-component" composition is one in which all constituents of the composition are in the same container and which is storage-stable per se.

A composition referred to as a "two-component" composition is one in which the constituents of the composition are in two different components which are stored in separate containers and are not mixed with one another until shortly before or during the application of the composition.

The moisture-curing polyurethane composition is preferably a one-component composition. Given suitable packaging and storage, it is storage-stable, typically over several months, up to one year or longer.

On application of the moisture-curing polyurethane composition, the process of curing commences. This results in the cured composition.

In the case of a one-component composition, it is applied as such and then begins to cure under the influence of moisture or water. For acceleration of the curing, an accelerator component which contains or releases water and/or a catalyst and/or a curing agent can be mixed into the composition on application, or the composition, after application thereof, can be contacted with such an accelerator component.

In the course of curing, the isocyanate groups react with one another under the influence of moisture. If the moisture-curing polyurethane composition contains a blocked amine, the isocyanate groups additionally react with the blocked amino groups as they are hydrolyzed. The totality of these reactions of isocyanate groups that lead to the curing of the composition is also referred to as crosslinking.

The moisture required for the curing of the moisture-curing polyurethane composition preferably gets into the composition through diffusion from the air (atmospheric moisture). In the process, a solid layer of cured composition ("skin") is formed on the surfaces of the composition which come into contact with air. The curing continues in the direction of diffusion from the outside inward, the skin becoming increasingly thick and ultimately encompassing the entire composition applied. The moisture can also get into the composition additionally or entirely from one or more substrate(s) to which the composition has been applied and/or can come from an accelerator component which is mixed into the composition on application or is contacted therewith after application, for example by painting or spraying.

The moisture-curing polyurethane composition is preferably applied at ambient temperature, especially in the range from about −10 to 50° C., preferably in the range from −5 to 45° C., especially 0 to 40° C.

The moisture-curing polyurethane composition is preferably likewise cured at ambient temperature.

The moisture-curing polyurethane composition has a long processing time (open time) and rapid curing.

"Open time" refers to the period of time during which the composition can be processed or reprocessed after application without any loss of its ability to function. If the composition is used as adhesive, the open time especially also refers to the period of time within which a bond must have been made after application thereof in order to develop sufficient adhesion. In the case of a one-component composition, the open time has been exceeded when a skin has formed, if not sooner.

The "curing rate" refers to the degree of polymer formation in the composition within a given period of time after application, for example by determining the thickness of the skin formed.

The moisture-curing polyurethane composition after curing preferably has a tensile strength of at least 1 MPa, especially at least 2 MPa, determined to DIN EN 53504 at a tension rate of 200 mm/min, especially as described in the examples.

The moisture-curing polyurethane composition after curing preferably also has an elongation at break of at least 300%, especially at least 500%, determined to DIN EN 53504 at a tension rate of 200 mm/min, especially as described in the examples.

Preference is given to using the moisture-curing polyurethane composition as elastic adhesive or elastic sealant or elastic coating.

The moisture-curing polyurethane composition as adhesive and/or sealant is especially suitable for bonding and sealing applications in the construction and manufacturing industry or in motor vehicle construction, especially for parquet bonding, assembly, bonding of installable components, module bonding, pane bonding, join sealing, bodywork sealing, seam sealing or cavity sealing.

Elastic bonds in motor vehicle construction are, for example, the bonded attachment of parts such as plastic covers, trim strips, flanges, fenders, driver's cabins or other installable components to the painted body of a motor vehicle, or the bonding of panes into the vehicle body, said motor vehicles especially being automobiles, trucks, buses, rail vehicles or ships.

The moisture-curing polyurethane composition is especially suitable as sealant for the elastic sealing of all kinds of joins, seams or cavities, especially of joins in construction, such as expansion joins or connection joins between structural components, or of floor joins in civil engineering. A sealant having flexible properties and high cold flexibility is particularly suitable especially for the sealing of expansion joins in built structures.

As a coating, the moisture-curing polyurethane composition is especially suitable for protection and/or for sealing of built structures or parts thereof, especially for balconies, terraces, roofs, especially flat roofs or slightly inclined roof areas or roof gardens, or in building interiors beneath tiles or ceramic plates in wet rooms or kitchens, or in collection pans, conduits, shafts, silos, tanks or wastewater treatment systems.

It can also be used for repair purposes as seal or coating, for example of leaking roof membranes or floor coverings that are no longer fit for purpose, or as repair compound for highly reactive spray seals.

The moisture-curing polyurethane composition can be formulated such that it has a pasty consistency with structurally viscous properties. A composition of this kind is applied by means of a suitable device, for example from commercial cartridges or kegs or hobbocks, for example in the form of a bead, which may have an essentially round or triangular cross-sectional area.

The moisture-curing polyurethane composition can also be formulated such that it is fluid and "self-leveling" or only slightly thixotropic and can be poured out for application. As coating, it can, for example, subsequently be distributed flat up to the desired layer thickness, for example by means of a roller, a slide bar, a toothed applicator or a trowel. In one operation, typically a layer thickness in the range from 0.5 to 3 mm, especially 1.0 to 2.5 mm, is applied.

Suitable substrates which can be bonded or sealed or coated with the moisture-curing polyurethane composition are especially glass, glass ceramic, concrete, mortar, cement screed, fiber cement, especially fiber cement boards, brick, tile, gypsum, especially gypsum boards or anhydrite screed, or natural stone, such as granite or marble, repair or leveling compounds based on PCC (polymer-modified cement mortar) or ECC (epoxy resin-modified cement mortar);

metals or alloys, such as aluminum, copper, iron, steel, nonferrous metals, including surface-finished metals or alloys, such as zinc-plated or chromium-plated metals;

asphalt or bitumen;

leather, textiles, paper, wood, wood materials bonded with resins, such as phenolic, melamine or epoxy resins, resin/textile composites or further materials called polymer composites;

plastics, such as rigid and flexible PVC, polycarbonate, polystyrene, polyester, polyamide, PMMA, ABS, SAN, epoxy resins, phenolic resins, PUR, POM, TPO, PE, PP, EPM or EPDM, in each case untreated or surface-treated, for example by means of plasma, corona or flames;

fiber-reinforced plastics, such as carbon fiber-reinforced plastics (CFP), glass fiber-reinforced plastics (GFP) and sheet molding compounds (SMC);

insulation foams, especially made of EPS, XPS, PUR, PIR, rock wool, glass wool or foamed glass;

coated or painted substrates, especially painted tiles, coated concrete, powder-coated metals or alloys or painted metal sheets;

paints or varnishes, especially automotive topcoats.

If required, the substrates can be pretreated prior to application, especially by physical and/or chemical cleaning methods or the application of an activator or a primer.

It is possible to bond and/or seal two identical or two different substrates.

The invention further provides a method of bonding or sealing, comprising the steps of
(i) applying the moisture-curing polyurethane composition
to a first substrate and contacting the composition with a second substrate within the open time of the composition, or
to a first and to a second substrate and joining the two substrates within the open time of the composition, or
between two substrates,
(ii) curing the composition by contact with moisture.

The invention further provides a method of coating or sealing, comprising the steps of
(i) applying the moisture-curing polyurethane composition to a substrate,
(ii) curing the composition by contact with moisture.

The application and curing of the moisture-curing polyurethane composition or the method of bonding or sealing or the method of coating or sealing affords an article bonded or sealed or coated with the composition. This article may be a built structure or a part thereof, especially a built structure in civil engineering above or below ground, a bridge, a roof, a staircase or a façade, or it may be an industrial good or a consumer good, especially a window, a pipe, a rotor blade of a wind turbine, a domestic appliance or a mode of transport, such as especially an automobile, a bus, a truck, a rail vehicle, a ship, an aircraft or a helicopter, or an installable component thereof.

The invention thus further provides an article obtained from the described method of bonding or sealing or from the described method of coating or sealing.

The moisture-curing polyurethane composition has advantageous properties.

On account of its low monomeric diisocyanate content, it can be safely handled even without special safety precautions and does not require any hazard labeling in relation to the monomeric diisocyanates, is very storage-stable with exclusion of moisture, has very good applicability and has a long processing time (open time) coupled with surprisingly rapid curing. This gives rise to an elastic material of surprisingly high tensile strength coupled with high extensibility, with high cold flexibility, good bonding properties and high stability to heat and moisture.

EXAMPLES

Working examples are adduced hereinafter, which are intended to elucidate the invention described. The invention is of course not limited to these described working examples.

"Standard climatic conditions" ("SCC") refer to a temperature of 23±1° C. and a relative air humidity of 50±5%.

Unless stated otherwise, the chemicals used were from Sigma-Aldrich.

Preparation of Polyethers Having Blocked Hydroxyl Groups

Viscosity was measured with a thermostated Rheotec RC30 cone-plate viscometer (cone diameter 25 mm, cone angle 1°, cone tip-plate distance 0.05 mm, shear rate 10 s$^{-1}$).

Infrared spectra (FT-IR) were measured as undiluted films on a Nicolet iS5 FT-IR instrument from Thermo Scientific equipped with a horizontal ATR measurement unit with a diamond crystal. The absorption bands are reported in wavenumbers (cm$^{-1}$).

$^1$H NMR spectra were measured on a spectrometer of the Bruker Ascend 400 type at 400.14 MHz; the chemical shifts $\delta$ are reported in ppm relative to tetramethylsilane (TMS). No distinction was made between true coupling and pseudo-coupling patterns.

Compound V-1: Butanol-started acetylated PPG monool with average molecular weight $M_n$ about 790 g/mol 120.00 g of butanol-started polyoxypropylene monool (Synalox® 100-20B, average molecular weight $M_n$ about 750 g/mol; from Dow) and 18.74 g of acetic anhydride were initially charged in a round-bottom flask with distillation attachment under a nitrogen atmosphere. Then the reaction mixture was stirred under a gentle nitrogen stream at 130° C., with collection of acetic acid as distillate. Subsequently, the volatile constituents were removed from the reaction mixture at 80° C. and a reduced pressure of 10 mbar. A clear, colorless liquid having a viscosity of 74 mPa·s at 20° C. was obtained.

FT-IR: 2970, 2931, 2867, 1738, 1454, 1372, 1345, 1296, 1241, 1098, 1014, 959, 925, 866, 827.

$^1$H NMR (CDCl$_3$): 5.02 (hept., 1H, CH$_2$(CH$_3$)CH—OAc), 3.75-3.34 (2×m, ca. 39H, OCH$_2$CH(CH$_3$)O), 3.33-3.28 (m, 2H, CH$_3$CH$_2$CH$_2$CH$_2$O), 2.04 (s, 3H, O(CO)CH$_3$), 1.55 (quint., 2H, CH$_3$CH$_2$CH$_2$CH$_2$O), 1.36 (sext., 2H, CH$_3$CH$_2$CH$_2$CH$_2$), 1.22 (d, 3H, CH$_2$(CH$_3$)CH—OAc), 1.17-1.10 (m, ca. 36H, OCH$_2$CH(CH$_3$)O), 0.91 (t, 3H, CH$_3$CH$_2$CH$_2$CH$_2$O).

Compound V-2: Diacetylated PPG diol with average molecular weight $M_n$ about 1'080 g/mol 80.00 g of polyoxypropylene diol (Voranol® P 1010, OH number 110 mg KOH/g; from Dow) and 18.74 g of acetic anhydride were converted as described for compound V-1. A clear, colorless liquid having a viscosity of 145 mPa·s at 20° C. was obtained.

Compound V-3: Diacetylated PPG diol with average molecular weight $M_n$ about 4'080 g/mol 600.0 g of polyoxypropylene diol (Acclaim® 4200, OH number 28 mg KOH/g; from Covestro) and 33.7 g of acetic anhydride were converted as described for compound V-1. A clear, colorless liquid having a viscosity of 1'174 mPa·s at 20° C. was obtained.

Preparation of Polymers Containing Isocyanate Groups

Viscosity was measured with a thermostated Rheotec RC30 cone-plate viscometer (cone diameter 50 mm, cone angle 1°, cone tip-plate distance 0.05 mm, shear rate 10 s$^{-1}$).

Monomeric diisocyanate content was determined by means of HPLC (detection via photodiode array; 0.04 M sodium acetate/acetonitrile as mobile phase) after prior derivation by means of N-propyl-4-nitrobenzylamine.

Polymer P1:

725.0 g of Desmophen® 5031 BT (glycerol-started ethylene oxide-terminated polyoxypropylene triol, OH number 28.0 mg KOH/g, OH functionality about 2.3; from Covestro) and 275 g of diphenylmethane 4,4'-diisocyanate (Desmodur® 44 MC L, from Covestro) were converted by a known method at 80° C. to a polyetherurethane polymer having an NCO content of 7.6% by weight, a viscosity of 6.5 Pa·s at 20° C. and a monomeric diphenylmethane 4,4'-diisocyanate content of about 20% by weight.

Subsequently, the volatile constituents, especially a majority of the monomeric diphenylmethane 4,4'-diisocyanate, were removed by distillation in a short-path evaporator (jacket temperature 180° C., pressure 0.1 to 0.005 mbar, condensation temperature 47° C.). The polyetherurethane polymer thus obtained had an NCO content of 1.7% by weight, a viscosity of 19 Pa·s at 20° C. and a monomeric diphenylmethane 4,4'-diisocyanate content of 0.04% by weight.

Polymer P2:

727.0 g of Acclaim® 4200 (polyoxypropylene diol, OH number 28.0 mg KOH/g; from Covestro) and 273.0 g of diphenylmethane 4,4'-diisocyanate (Desmodur® 44 MC L, from Covestro) were converted by a known method at 80° C. to a polyetherurethane polymer having an NCO content of 7.6% by weight, a viscosity of 5.2 Pa·s at 20° C. and a monomeric diphenylmethane 4,4'-diisocyanate content of about 18% by weight.

Subsequently, the volatile constituents, especially a majority of the monomeric diphenylmethane 4,4'-diisocyanate, were removed by distillation in a short-path evaporator (jacket temperature 180° C., pressure 0.1 to 0.005 mbar, condensation temperature 47° C.). The polyetherurethane polymer thus obtained had an NCO content of 1.8% by weight, a viscosity of 15.2 Pa·s at 20° C. and a monomeric diphenylmethane 4,4'-diisocyanate content of 0.08% by weight.

Polymer P3:

300.0 g of Desmophen® 5031 BT (glycerol-started ethylene oxide-terminated polyoxypropylene triol, OH number 28.0 mg KOH/g, from Covestro), 300.0 g of Acclaim® 4200 (polyoxypropylene diol, OH number 28.0 mg KOH/g, from Covestro), 75.5 g of compound V-1 and 78.8 g of diphenylmethane 4,4'-diisocyanate (Desmodur® 44 MC L, from Covestro) were converted by the known method at 80° C. The polyetherurethane polymer thus obtained had an NCO content of 1.65% by weight, a viscosity of 67.1 Pa·s at 20° C. and a monomeric diphenylmethane 4,4'-diisocyanate content of 2.1% by weight.

Polymer P4:

The polymer P4 was prepared as described for polymer P3, except using the same amount of compound V-2 rather than compound V-1. The polyetherurethane polymer thus obtained had an NCO content of 1.68% by weight, a viscosity of 56.8 Pa·s at 20° C. and a monomeric diphenylmethane 4,4'-diisocyanate content of 2.0% by weight.

Polymer P5:

The polymer P5 was prepared as described for polymer P3, except using the same amount of compound V-3 rather than compound V-1. The polyetherurethane polymer thus obtained had an NCO content of 1.68% by weight, a viscosity of 67.8 Pa·s at 20° C. and a monomeric diphenylmethane 4,4'-diisocyanate content of 2.0% by weight.

Moisture-Curing Polyurethane Compositions

Compositions Z1 to Z7:

For each composition, the ingredients specified in table 1 were mixed in the amounts specified (in parts by weight) by means of a centrifugal mixer (SpeedMixer™ DAC 150, FlackTek Inc.) with exclusion of moisture at 3000 rpm for one minute and stored with exclusion of moisture. Each composition was tested as follows:

A measure determined for storage stability was the viscosity of the composition after storage, in that one closed cartridge in each case was stored at room temperature for 1 day or in an air circulation oven at 60° C. for 7 days, and then the viscosity was measured with a thermostated Rheotec RC30 cone-plate viscometer (cone diameter 25 mm, cone angle 1°, cone tip-plate distance 0.05 mm, shear rate 10 s$^{-1}$). The results are given the addition "1d RT" or "7d 60° C.".

A measure determined for the processing time (open time) was the skin time ("ST"). For this purpose, a few grams of the composition were applied to cardboard in a layer thickness of about 2 mm and, under standard climatic conditions, the first period of time after which no residues remained any longer on an LDPE pipette used to gently tap the surface of the composition was determined.

A measure determined for the curing rate was curing after 24 h under standard climatic conditions. For this purpose, the composition was applied as a free-standing cone of diameter 3 cm, left to stand under standard climatic conditions and cut open with a crosscut after 24 h, and the layer thickness of the cured polymer ring formed was measured.

As a measure of mechanical properties and stability to heat and hydrolysis, each composition was pressed between two wax-coated transfer printing papers to give a film of thickness 2 mm and stored under standard climatic conditions for 7 days. After the wax papers had been removed, a few dumbbells having a length of 75 mm and a bar length of 30 mm and a bar width of 4 mm were punched out of the film. These were used to determine tensile strength, elongation at break and modulus of elasticity at 0.5-5% elongation or 0.5-50% elongation in accordance with DIN EN 53504 at a strain rate of 200 mm/min. These results are given the addition "7d SCC". In addition, further punched-out dumbbells were stored in an air circulation oven at 100° C. for 7 days or at 70° C./100% relative humidity for 7 days, cooled down under standard climatic conditions and tested in the manner already described for tensile strength, elongation at break, and 5% and 50% modulus of elasticity. These results are given the addition "7d 100° C." or "7d 70/100".

To determine the strength of an adhesive bond, lap shear strength ("LSS") was determined on glass. For this purpose, composite specimens were produced by bonding two glass plates that had been degreased with isopropanol and pretreated with Sika® Primer 207 (from Sika Schweiz) in such a way that the overlapping adhesive bond had dimensions of 12×25 mm and a thickness of 4 mm and the glass plates protruded at the top ends. After the composite specimens had been stored under standard climatic conditions for 7 d, lap shear strength was tested to DIN EN 1465 at a strain rate of 20 mm/min.

Shore A hardness was determined according to DIN 53505 on test specimens cured under standard climatic conditions for 7 d.

Complex modulus of elasticity M* was determined by means of DMTA measurement on strip samples (height 2-3 mm, width 2-3 mm, length 8.5 mm) which had been stored/cured under standard climatic conditions for 7 days, with a Mettler DMA/SDTA 861e instrument. The measurement conditions were: measurement in tensile mode, excitation frequency 10 Hz and heating rate 5 K/min. The samples were cooled down to −70° C. and heated to 100° C. with determination of M*. Table 1 reports M* at −20° C., −10° C., 0° C., 10° C. and 20° C. A low value for the M*(−20° C.)/M*(20° C.) ratio is a measure of good temperature independence of the modulus of elasticity, and high cold flexibility.

The results are reported in table 2.

Compositions Z2, Z3 and Z4 are inventive examples. Compositions Z1 and Z5 to Z7 are comparative examples and are given the addition "(Ref.)".

Comparative example Z1 contains a conventional prior art plasticizer, and comparative examples Z5 to Z7 each contain a conventionally prepared polymer containing isocyanate groups and having a high monomeric diisocyanate content.

TABLE 1

Composition (in parts by weight) of Z1 to Z7.

| Composition | Z1 (Ref.) | Z2 | Z3 | Z4 | Z5 (Ref.) | Z6 (Ref.) | Z7 (Ref.) |
|---|---|---|---|---|---|---|---|
| Polymer | P1 17.5 | P1 17.5 | P1 17.5 | P1 17.5 | P3 38.9 | P4 38.9 | P5 38.9 |
|  | P2 17.5 | P2 17.5 | P2 17.5 | P2 17.5 |  |  |  |
| Plasticizer | DINP 20.4 | V-1 20.4 | V-2 20.4 | V-3 20.4 | V-1 16.5 | V-2 16.5 | V-3 16.5 |
| Carbon black | 10.0 | 10.0 | 10.0 | 10.0 | 10.0 | 10.0 | 10.0 |
| Chalk[1] | 32.0 | 32.0 | 32.0 | 32.0 | 32.0 | 32.0 | 32.0 |
| Silica[2] | 2.0 | 2.0 | 2.0 | 2.0 | 2.0 | 2.0 | 2.0 |
| DMDEE[3] | 0.2 | 0.2 | 0.2 | 0.2 | 0.2 | 0.2 | 0.2 |
| pTSI[4] | 0.4 | 0.4 | 0.4 | 0.4 | 0.4 | 0.4 | 0.4 |

[1]Omyacarb ® 5 GU (from Omya)
[2]Aerosil ® R 972 (from Evonik)
[3]2,2'-dimorpholinodiethyl ether
[4]p-toluenesulfonyl isocyanate

TABLE 2

Properties of Z1 to Z7.

| Composition |  | Z1 (Ref.) | Z2 | Z3 | Z4 | Z5 (Ref.) | Z6 (Ref.) | Z7 (Ref.) |
|---|---|---|---|---|---|---|---|---|
| Viscosity | 1 d RT | 61 | 46 | 69 | 97 | 146 | 157 | 240 |
| [Pa · s] | 7 d 60° C. | 134 | 106 | 217 | 267 | 285 | 361 | 472 |
| ST [min] |  | 40 | 40 | 40 | 40 | 40 | 40 | 40 |
| Curing after 24 h [mm] |  | 4.0 | 5.3 | 4.7 | 4.6 | 4.3 | 4.5 | 4.1 |
| 7 d SCC: |  |  |  |  |  |  |  |  |
| Tensile strength [MPa] |  | 3.81 | 5.19 | 5.52 | 5.76 | 4.89 | 4.12 | 5.40 |
| Elongation at break [%] |  | 772 | 831 | 856 | 816 | 833 | 745 | 835 |
| Modulus of elasticity [MPa] 5% |  | 1.57 | 1.59 | 1.56 | 1.74 | 1.76 | 1.77 | 1.59 |
| 50% |  | 0.83 | 0.90 | 0.86 | 1.01 | 1.04 | 0.97 | 0.99 |
| 7 d 100° C.: |  |  |  |  |  |  |  |  |
| Tensile strength [MPa] |  | 5.62 | 5.40 | 5.51 | 5.14 | 4.77 | 3.66 | 4.61 |
| Elongation at break [%] |  | 688 | 649 | 712 | 674 | 614 | 539 | 646 |
| Modulus of elasticity [MPa] 5% |  | 1.77 | 1.62 | 1.46 | 1.47 | 2.00 | 1.76 | 1.68 |
| 50% |  | 1.05 | 1.01 | 0.87 | 0.95 | 1.32 | 1.13 | 1.21 |
| 7 d 70/100: |  |  |  |  |  |  |  |  |
| Tensile strength [MPa] |  | 4.58 | 4.85 | 4.89 | 5.03 | 4.55 | 4.50 | 4.87 |
| Elongation at break [%] |  | 659 | 654 | 699 | 662 | 626 | 661 | 662 |
| Modulus of elasticity [MPa] 5% |  | 1.34 | 1.25 | 1.20 | 1.36 | 1.58 | 1.57 | 1.44 |
| 50% |  | 0.75 | 0.76 | 0.71 | 0.85 | 0.90 | 0.84 | 0.88 |
| LSS (glass) [MPa] |  | 2.41 | 2.71 | 2.13 | 2.74 | 2.53 | 2.26 | 2.74 |
| Shore A |  | 38 | 39 | 38 | 39 | 41 | 39 | 38 |
| M* (DMTA) [MPa] | −20° C. | 10.2 | 7.4 | 8.5 | 10.3 | n.d. | n.d. | n.d. |
|  | −10° C. | 7.1 | 5.2 | 6.1 | 6.9 |  |  |  |
|  | 0° C. | 5.4 | 4.1 | 4.8 | 5.2 |  |  |  |
|  | 10° C. | 4.3 | 3.4 | 4.0 | 4.2 |  |  |  |
|  | 20° C. | 3.6 | 3.0 | 3.4 | 3.6 |  |  |  |
| M*(−20° C.)/M*(20° C.) |  | 2.83 | 2.47 | 2.50 | 2.86 |  |  |  |

"n.d." stands for "not determined"

It is apparent from table 2 that the inventive compositions Z2, Z3 and Z4, given the same open time (skin time), cure more quickly (thicker cured skin after 24 h), both by comparison with reference composition Z1 comprising a typical plasticizer from the prior art and having a low monomeric diisocyanate content and by comparison with the reference compositions Z5, Z6 and Z7 having a high monomeric diisocyanate content.

It is also apparent that the inventive compositions Z2, Z3 and Z4 have a distinctly higher tensile strength than the respective reference compositions, with uniformly high to slightly higher elongation at break and similar properties in relation to Shore hardness, adhesion and resistance to dry and moist heat.

Finally, the inventive compositions Z2 and Z3 show a distinct improvement in cold flexibility compared to reference composition Z1, whereas inventive composition Z4 comprising the polyether of very high molecular weight that has blocked hydroxyl groups shows similar cold flexibility.

The invention claimed is:

1. A moisture-curing polyurethane composition having a monomeric diisocyanate content of not more than 0.1% by weight, the moisture-curing polyurethane composition comprising
   20% to 60% of at least one polyetherurethane polymer containing isocyanate groups and having a monomeric diisocyanate content of not more than 0.5% by weight, the at least one polyetherurethane polymer having been obtained from the reaction of at least one monomeric diisocyanate with at least one polyether polyol in an NCO/OH ratio of at least 3/1, and subsequent removal of a majority of the monomeric diisocyanates by means of a suitable separation method,
   5% to 35% of at least one polyether having blocked hydroxyl groups, which is free of isocyanate groups, as plasticizer, wherein the blocked hydroxyl groups are acetate groups,
   20% to 60% by weight of fillers, and
   optionally further constituents.

2. The polyurethane composition as claimed in claim 1, wherein the polyetherurethane polymer has an NCO content in the range from 0.5% to 6.0% by weight.

3. The polyurethane composition as claimed in claim 1, wherein the polyetherurethane polymer has 80% to 100% by weight of 1,2-propyleneoxy groups and 0% to 20% by weight of 1,2-ethyleneoxy groups in the polyether segment.

4. The polyurethane composition as claimed in claim 1, wherein the monomeric diisocyanate used for the reaction is diphenylmethane 4,4'-diisocyanate, tolylene 2,4-diisocyanate or mixtures thereof with tolylene 2,6-diisocyanate, 1-isocyanato-3,3,5-trimethyl-5-isocyanatomethylcyclohexane or hexane 1,6-diisocyanate.

5. The polyurethane composition as claimed in claim 1, wherein the NCO content of the polyetherurethane polymer is at least 80% of the theoretical NCO content which is calculated from the addition of one mole of monomeric diisocyanate per mole of OH groups of the polyether polyol.

6. The polyurethane composition as claimed in claim 1, wherein the polyether having blocked hydroxyl groups is derived from a hydroxy-functional polyether having an average OH functionality in the range from 1 to 3.

7. The polyurethane composition as claimed in claim 1, wherein the polyether having blocked hydroxyl groups has an average molecular weight $M_n$ in the range from 600 to 15,000 g/mol, determined by means of gel permeation chromatography (GPC) versus polystyrene standard with tetrahydrofuran as mobile phase, refractive index detector and evaluation from 200 g/mol.

8. The polyurethane composition as claimed in claim 1, further comprising at least one further constituent selected from oligomeric isocyanates and catalysts.

9. A method of bonding or sealing, comprising the steps of
   (i) applying the polyurethane composition as claimed in claim 1
       to a first substrate and contacting the composition with a second substrate within the open time of the composition, or
       to a first and to a second substrate and joining the two substrates within the open time of the composition, or
       between two substrates,
   (ii) curing the composition by contact with moisture.

10. A method of coating or sealing, comprising the steps of
    (i) applying the polyurethane composition as claimed in claim 1 to a substrate,
    (ii) curing the composition by contact with moisture.

11. An article obtained from the method as claimed in claim 9.

* * * * *